April 30, 1946.   J. A. BRADLEY   2,399,426
REMOTE DETECTION AND CONTROL SYSTEM
Filed Oct. 7, 1940   5 Sheets-Sheet 3
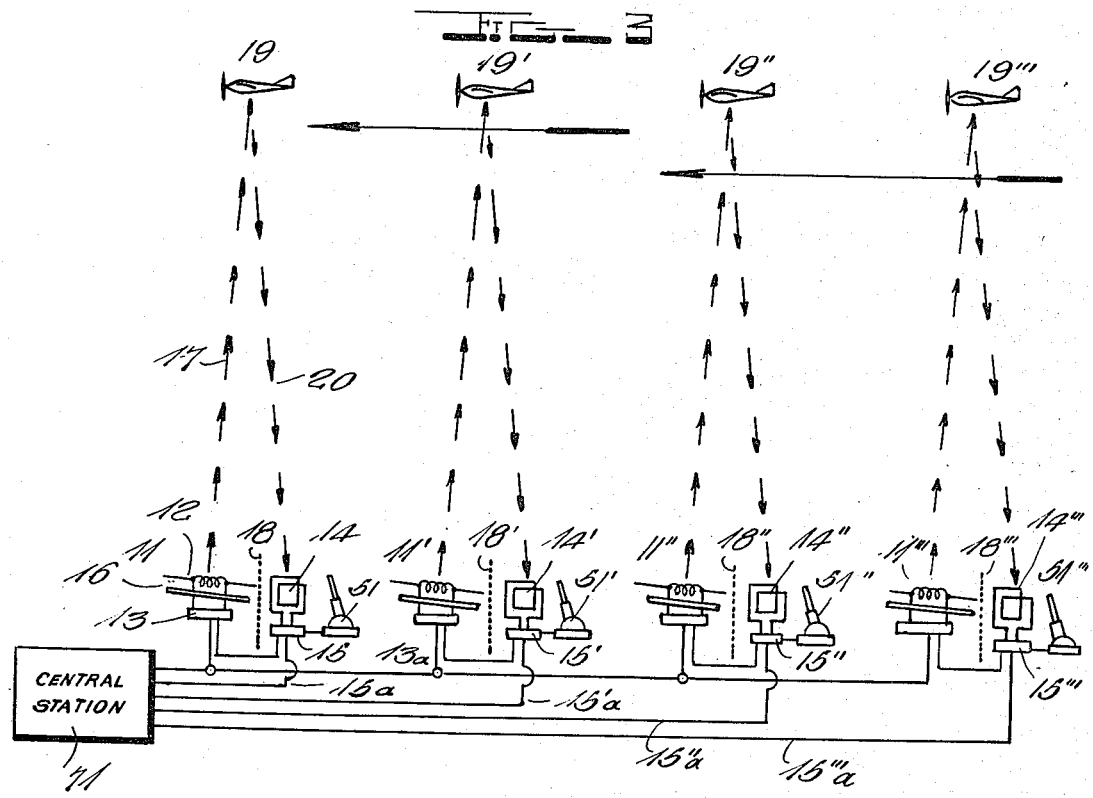
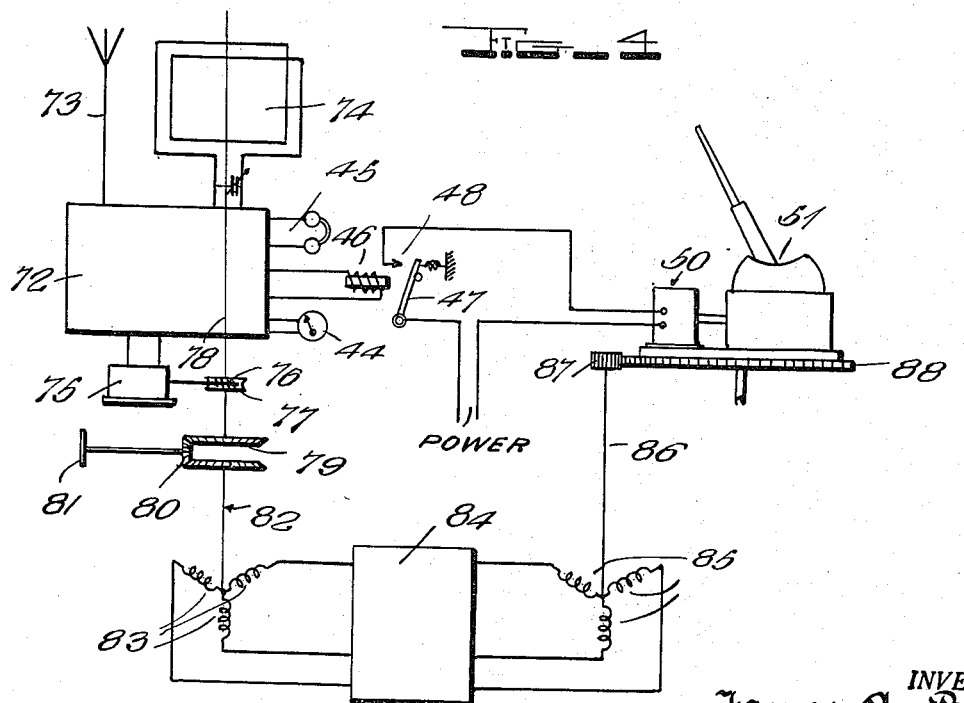
INVENTOR.
James A. Bradley
BY
John B. Brady
Attorney April 30, 1946.  J. A. BRADLEY  2,399,426
REMOTE DETECTION AND CONTROL SYSTEM
Filed Oct. 7, 1940   5 Sheets-Sheet 4
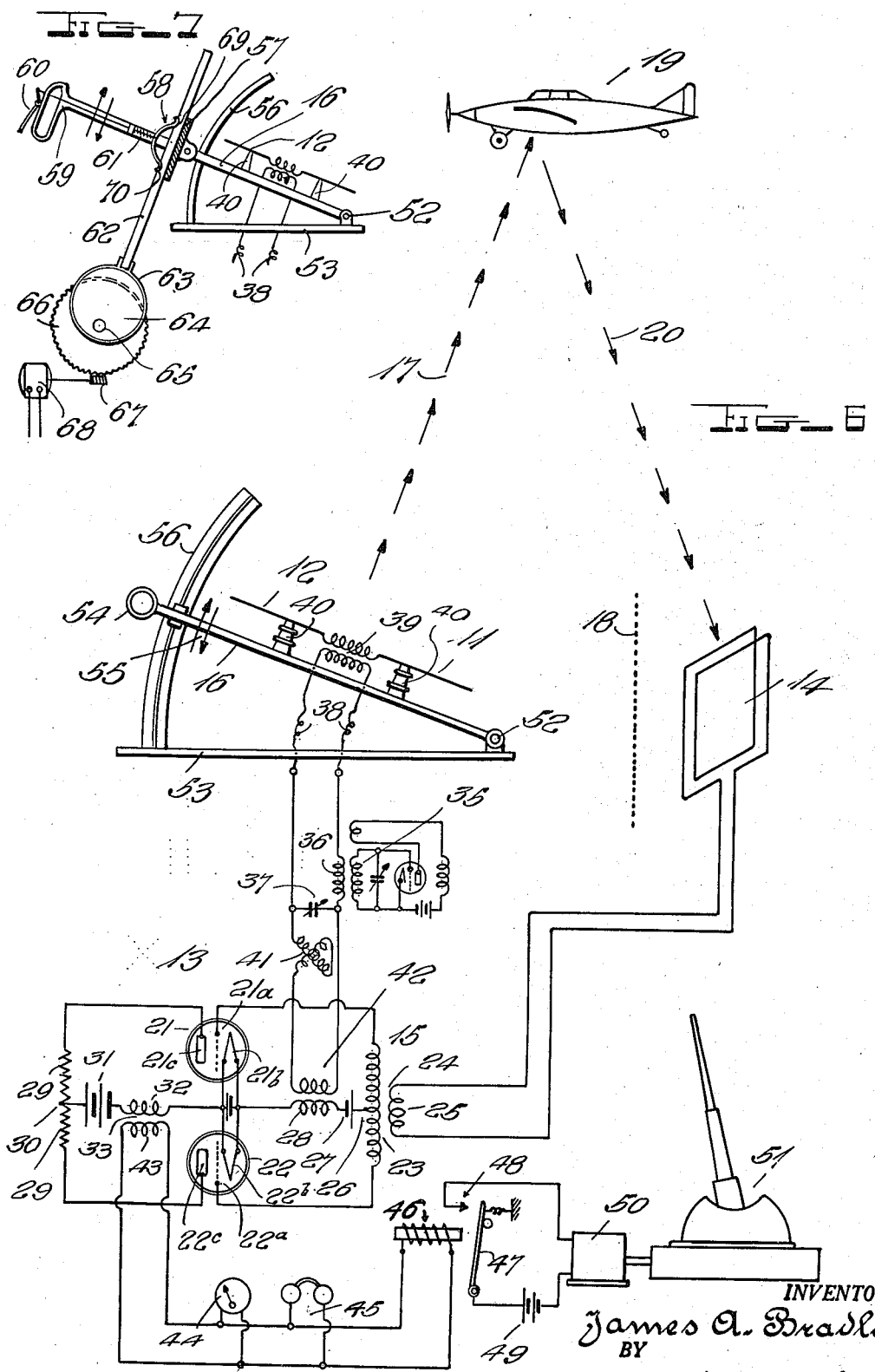

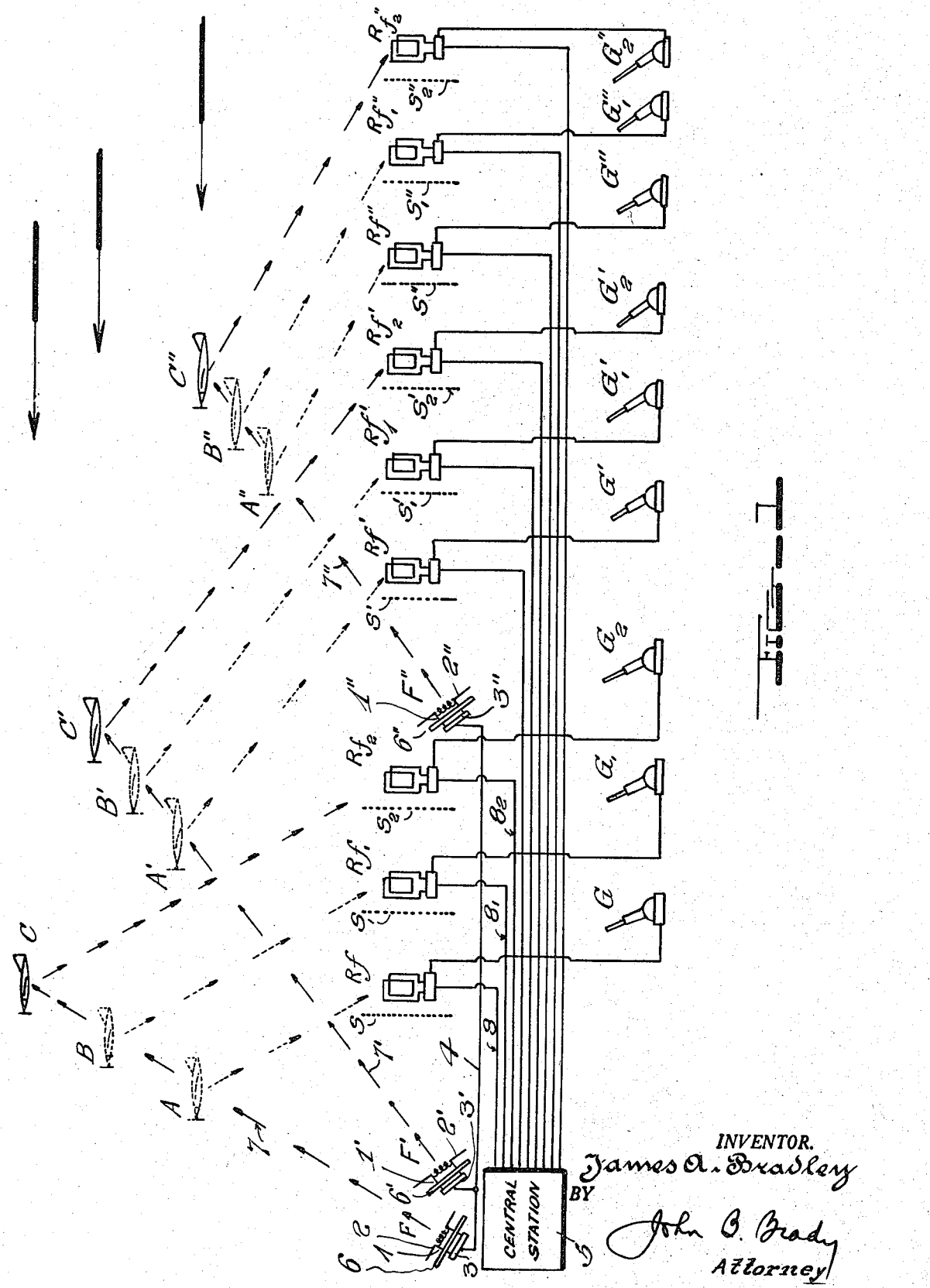

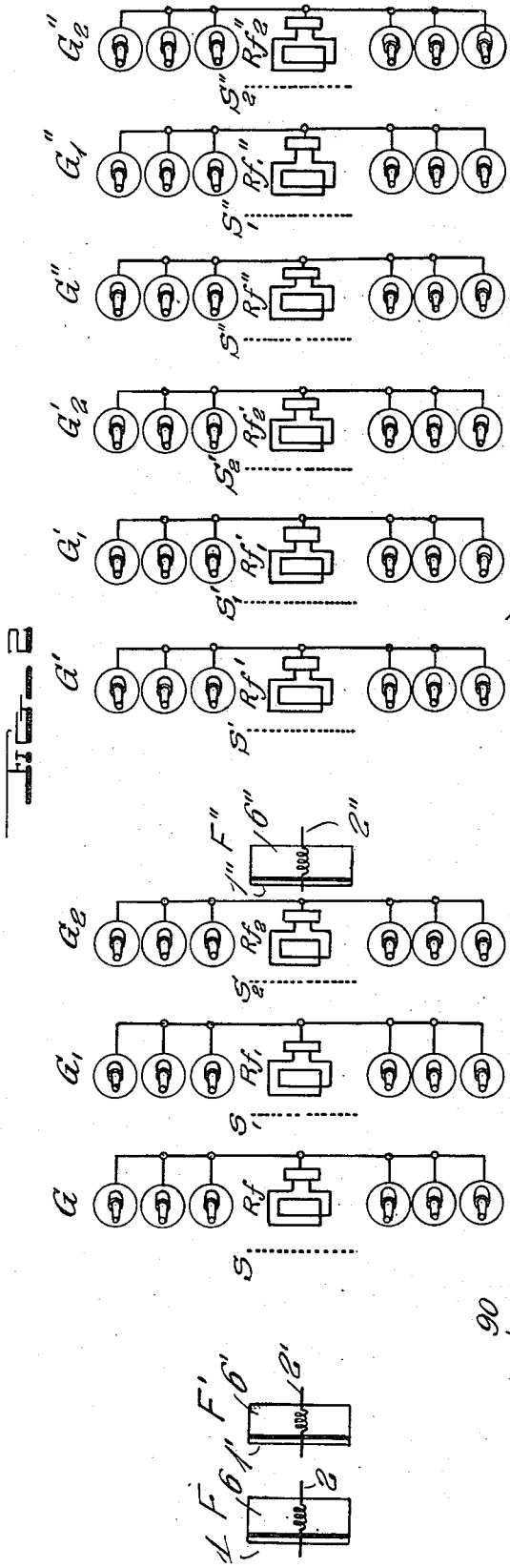
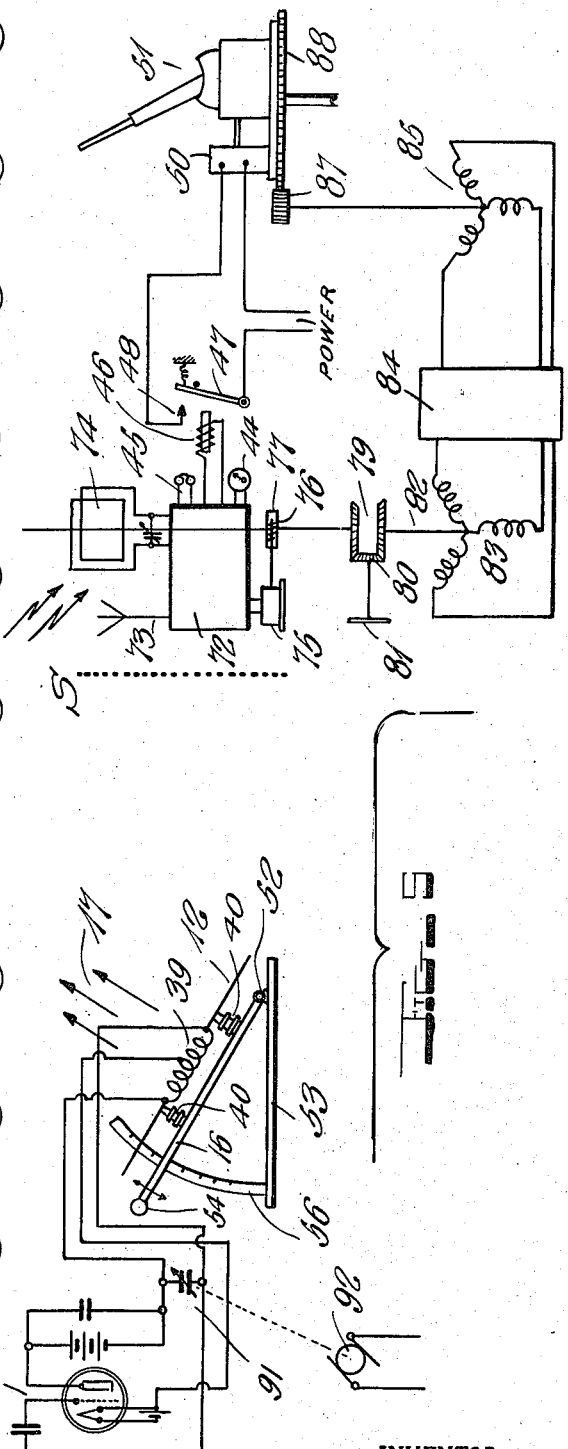

April 30, 1946. J. A. BRADLEY 2,399,426
REMOTE DETECTION AND CONTROL SYSTEM
Filed Oct. 7, 1940 5 Sheets-Sheet 5
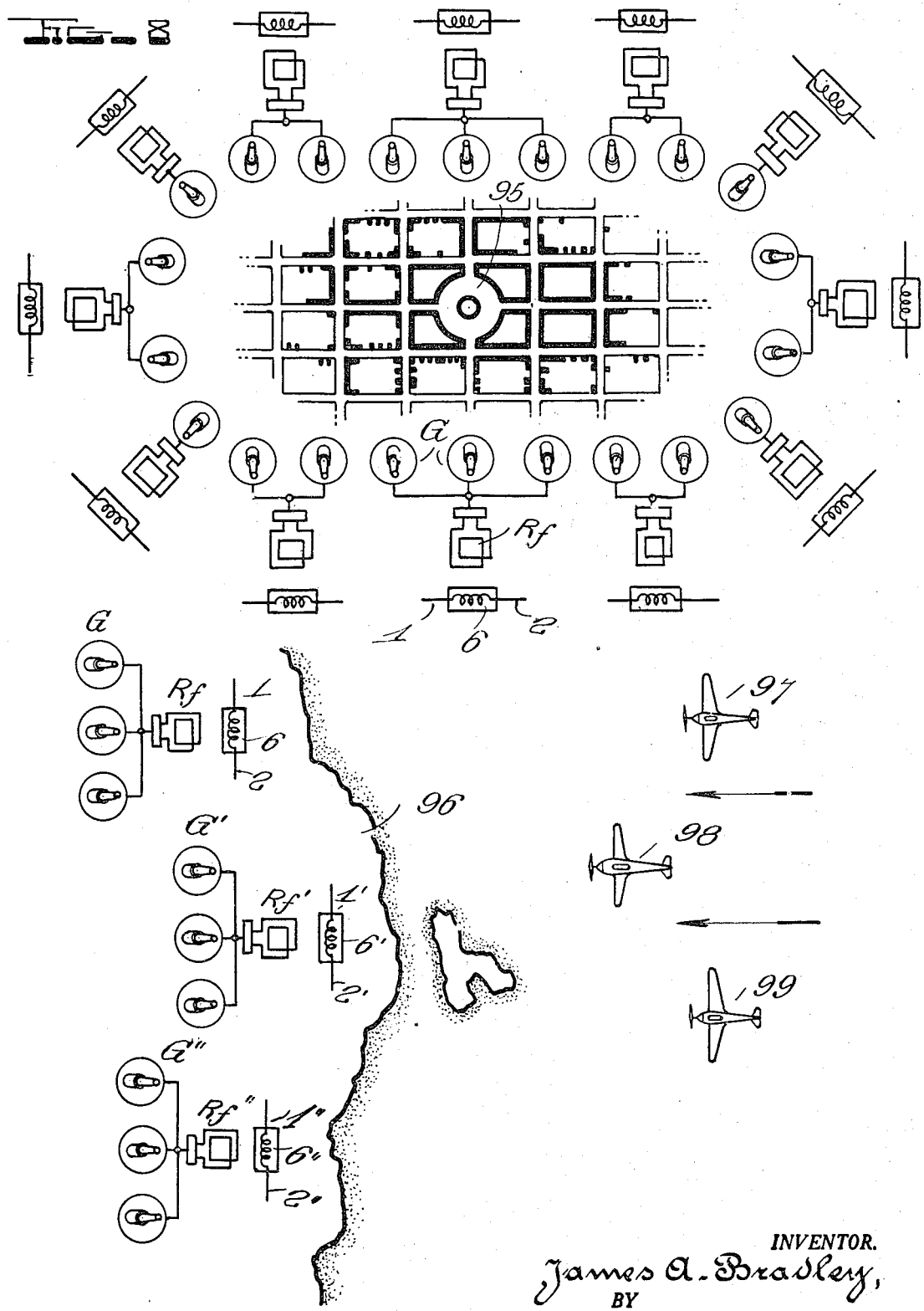

Patented Apr. 30, 1946

2,399,426

UNITED STATES PATENT OFFICE 2,399,426

REMOTE DETECTION AND CONTROL SYSTEM

James A. Bradley, St. Petersburg, Fla.

Application October 7, 1940, Serial No. 360,162

23 Claims. (Cl. 250—2)

My invention relates broadly to detection of mobile bodies and/or protection of large geographical areas against attack by mobile bodies and more particularly to a system employing reflected ultra-high frequency or other waves for detecting the approach of attacking mobile bodies and/or operating destructive weapons for disabling such attacking bodies.

One of the objects of my invention is to provide a system for the detection of approaching mobile bodies long in advance of the sight or sound range of such bodies with respect to a given point of observation.

Another object of my invention is to provide a system of protection of geographical areas against attack by approaching mobile bodies by indicating at suitable observing points the approach of attacking craft by making use of forms of energy capable of transmission faster than the velocity of sound and further than the capabilities of sight so that approaching mobile bodies may be detected long in advance of the sight or sound range of such craft with respect to an observing point.

Still another object of my invention is to provide a system of protection for geographical areas against attack by approaching craft in which beams of energy are propagated in confined paths through which the approaching craft may pass and by such passage cause a reflection of the energy to variously positioned receiving devices which in turn may be utilized to control the operation of destructive weapons for destroying the attacking craft.

A further object of my invention is to provide a system of protection of geographical areas against bombardment by attacking craft by propagation of vibratory impulses in the direction of such craft and utilizing the reflection of such impulses for actuating receiving devices which automatically control the aiming and firing of destructive weapons for disabling the attacking craft before the craft can become effective.

A still further object of my invention is to provide a system of protection of geographical areas against the attack of aircraft consisting in the propagation to high altitudes of energy which when intercepted by the aircraft at any altitude will be reflected and may be detected at variously positioned receiving stations and employed to actuate automatic orientation apparatus for remotely controlling the aiming of destructive weapons at the aircraft for disabling such craft before they can become effective.

Another object of my invention is to provide a system for protecting geographical areas against attack from aerial bombardment by propagating energy at spaced intervals into the path of attacking bombers which by their flight and passage through such energy effect a reflection of the energy to spaced listening stations which may either automatically control the orientation and aiming of destructive weapons for destroying the attacking bombers or will provide such signal response as will enable operatives to aim destructive weapons with precision upon the course of flight through which the bombers must pass for destroying such bombers before they can become effective and long before such bombers approach within visual or sound range of the listening stations.

Still another object of my invention is to provide a system for protecting geographical areas which consists in locating a multiplicity of energy propagating systems of the different frequency characteristics in spaced geographical positions and associating therewith a multiplicity of groups of energy receiving stations, each group of stations being responsive to frequencies of the propagated energy from selected energy propagating stations, individual listening stations being rendered effective by the reflection of propagated energy from certain of said propagating stations by approaching aircraft for effectively placing in operation destructive means for destroying approaching aircraft.

Other and further objects of my invention include the protection of life and property against enemy attack as set forth more fully in the specification hereinafter following by reference to the accompanying drawings, in which:

Figure 1 schematically illustrates in side elevation an arrangement of energy transmitting stations and listening stations at spaced intervals over a wide geographical area and schematically indicates means for automatically orienting and aiming destructive weapons for shelling the bombers in the course of flight thereof, the energy transmitting stations being shown in positions for propagating energy at different angles with respect to the surface of the earth so that attacking craft at various altitudes may be disabled long in advance of the sight or sound range of such craft at the observation positions; Fig. 2 is a plan view showing the arrangement of listening stations selectively responsive in spaced positions to the frequency of energy propagated by the different energy propagating stations; Fig. 3 is a side elevational view schematically illustrating a modified arrangement of energy propagating stations and listening stations in which the listening stations may be substantially adjacent the energy propagating stations; Fig. 4 schematically illustrates the apparatus at one of the listening stations and showing the automatic orientation control mechanism adapted to transmit impulses to a follow-up system for remotely controlling the orientation and aiming of destructive weapons and the operation of such destructive weapons successively and automatically instantly upon the approach of craft within the reflective range of the associated energy propagating system; Fig. 5 schematically shows the manner of exciting the ultra-high frequency energy propagating means and controlling the receiving means over a range of frequencies to which receiving stations located in various reflective ranges of the propagating means are arranged to respond; Fig. 6 shows schematically the arrangement of each of the transmitting and reflective receiving stations employed in the system of Fig. 3; Fig. 7 shows the arrangement I provide for propagating the ultra-high frequency energy in a beam and sweeping the path of flight of the aircraft combined with means for interrupting the operation of the sweeping means and selectively propagating the beam at a particular angle with respect to the earth's surface; Fig. 8 represents the manner of arranging fortresses about a metropolitan area and controlling the operation of the fortresses upon the approach of enemy craft; and Fig. 9 represents the manner of fortifying a coastline and automatically controlling the shelling of the path of flight of approaching aircraft when such aircraft reach a position for reflecting the upwardly propagated energy upon the directive receiving stations.

My invention makes use of principles heretofore urged by Lloyd Espenschied in Letters Patent 2,045,071 and 2,045,072, granted June 23, 1936, for Method and means for measuring altitude of aircraft, but utilizes such principles in an entirely new and useful manner for detecting approaching craft from ground stations. The system of my invention while employing principles recognized by Lloyd Espenschied goes far beyond any suggestion contained in the disclosure of Lloyd Espenschied by providing means for orienting and aiming destructive weapons upon approaching craft for effectively destroying such craft long in advance of the approach of such craft within the visual or sound range of an observing position.

My invention is directed to a system for the detection of aircraft, seacraft or other mobile bodies. My invention provides means for the protection of geographical areas against individual or mass attack by such craft. The system of my invention includes the automatic aiming and operation of defensive weapons against attacking aircraft, seacraft or other mobile bodies for destroying such attacking craft or mobile bodies before they can become effective. The invention is operable independent of conditions of the weather, and continuously throughout the day and night without the need for searchlights during the night. My invention is applicable for the protection of entire coastlines as well as concentrated metropolitan areas or manufacturing districts by a predetermined arrangement of a series of ultra-high frequency transmitting and receiving stations in properly spaced positions relative to the area to be protected.

More particularly my invention includes a multiplicity of ultra-high frequency directive transmitting stations in sufficient number as may be required operative conjointly to maintain zones of ultra-high frequency energy at high altitudes above the area within which the approach of aircraft is to be detected or within which approaching enemy craft are to be disabled before their attack may be effective. While I have described my invention particularly in connection with aircraft, all of the features of my invention apply equally to the detection and/or destruction of approaching enemy seacraft or landcraft in which event the zones of ultra-high frequency energy are maintained at such altitudes as will be intercepted by such approaching seacraft or landcraft.

The ultra-high frequency energy which is emitted by directional ultra-high frequency transmitters is radiated in such confined positions that similarly radiated energy from adjacent transmitters may overlap in zones with the first mentioned pattern of radiation for thereby establishing a continuous wall or zone of ultra-high frequency energy which must be pierced by approaching craft to thereby effect the operation of detection or defensive weapons as will be hereinafter described. Moreover, the system of my invention permits the setting up of ultra-high frequency transmitting stations of different frequency characteristics which will establish zones of ultra-high frequency energy at relatively close intervals without danger of interference for thereby selectively actuating coacting properly spaced receiving stations under the action of approaching craft for setting into operation selective detection apparatus and/or defensive weapons as will be hereinafter explained.

The coacting transmitting and receiving stations may be located at properly spaced intervals with respect to the area to be protected and the receiving apparatus activated by the approach of craft to automatically control the operation of detection apparatus and/or defensive weapons.

The system of my invention embodies the principle of reflection and/or absorption of ultra-high frequency energy by approaching craft. The ultra-high frequency transmitters employed in the system of my invention are arranged to emit ultra-high frequency energy in a zone which must be pierced by approaching craft seeking an objective. As such approaching craft pass through the concentrated zone of ultra-high frequency energy, the ultra-high frequency energy is reflected in the direction of receiving stations. These receiving stations are electrically shielded against direct actuation from the directive transmitting stations so that energy reaching the ultra-high frequency receivers is the energy reflected by approaching craft. Such reflected and received energy may operate detection apparatus and/or defensive weapons automatically trained upon a point or in advance of the point of reflection of the ultra-high frequency energy for compensating for altitude and velocity of movement of the craft. Such destructive weapons while remaining normally inert are brought into action immediately upon the passage of a reflecting body across the path of the ultra-high frequency beam. Such defensive weapon is preferably of the repeating type tending to fire successively upon the craft just after the craft has passed through the reflecting zone. Following craft such as succeeding waves of bombers pass through this zone of destructive fire as there is sufficient inertia in the operation of the destructive weapons to avoid cessation of firing immediately upon the passing of an initial craft.

The aiming apparatus should be so designed that, when it has received its initial impulse, the aiming operation will not be interfered with until after the firing has taken place, at which time the aiming apparatus immediately again becomes susceptible to impulses which set it into operation, in such a manner that successive waves of craft will have successive fire directed at them. The arrangement of transmitting and receiving stations for the protection of a coastline may be set up either in a parallel or a perpendicular line, or some composite of the two, with respect to the coast so that zones of energy must be intercepted by approaching craft. Because of the fact that transmitters with their coacting receivers may function on different frequencies, large numbers of protective stations may be utilized without mutual interference and yet secure the selective reflective control of receiving stations by the approaching aircraft. Moreover, such coacting transmitting and receiving stations may be located remote to the coastline either on vessels at sea or in land positions. The protective system of my invention lends itself very well to the location of coacting transmitting and receiving stations in properly spaced positions at sea for preventing destructive attacks.

My invention is further applicable to the complete surrounding of a metropolitan or manufacturing area by protective means arranged according to my invention in which the transmitters and coacting receivers are properly spaced in regard to the area to be protected so that approaching craft must pass through the activated zone for reflecting activated energy upon the receiving apparatus which in turn controls the detection and/or defensive weapons establishing fire in the path which must be crossed by approaching or attacking craft.

My invention also includes the detection of aircraft from other aircraft in flight and the detection of seacraft from other seacraft. These applications of my invention are useful both as a commercial protective measure as well as a military protective measure inasmuch as the approach of another aircraft may be detected from an aircraft in flight or the approach of a vessel from another vessel may be detected regardless of conditions of fog or weather long in advance of the visual or sound range between such craft, and collision thus avoided.

My invention is also applicable for guiding ships through a mine field or for determining the depth of water in the ocean or for determining the distance a submarine may be submerged or the distance between a submarine and its objective or the distance between mines in a mine field and a vessel seeking a safe course through the mine field. The distance between a vessel and shore may also be determined. When detecting mines by use of the system of my invention such mines may be exploded or destroyed if desired. The detection of such mines by use of the system of my invention is not limited to submerged mines at sea but the system of my invention may be used in detecting land mines or explosives in invaded territories. Unexploded time bombs may be detected by using the system of my invention and removed and destroyed before they can become effective.

Referring to the drawings in detail, reference character 1 designates an ultra-high frequency directional transmitting station or a station for propagating ultra-high frequency and/or other waves and is designated generally as including a doublet 2 coupled to an exciter indicated at 3 and connected through a control line indicated generally at 4 with a central station indicated at 5. The doublet 2 is provided with a reflector 6 extending adjacent thereto. Reflector 6 is adapted to be angularly shifted with respect to the earth's surface for directively propagating the ultra-high frequency or other waves from the transmitting station 1 in an upward direction. I have indicated the average course of the ultra-high frequency and/or other waves along the path 7. The frequency assigned to the transmitting station 1 is designated as F. In geographically spaced relation to transmitting station 1 I provide generally similar transmitting stations 1' and 1". The transmitting stations 1' and 1" comprise components similar to the components included in the transmitting station 1. I have numbered corresponding parts of transmitting station 1' at 2', 3' and 6' where the exciter 3' is connected to the control line 4 leading to central station 5 and in the case of transmitter 1" I have indicated corresponding parts at 2", 3" and 6" where the exciter 3" is connected to line wire 4 leading to central station 5. The transmitter 1' has the reflector 6' thereof angularly shiftable so that the beam of propagated energy may be directed along the course 7' at a different angular relation to the surface of the earth than the angular relation of beam 7 with respect to the surface of the earth. Similarly the reflector 6" is angularly shiftable at transmitter 1" so that beam 7" is propagated at still another angular relation to the surface of the earth. I have designated the frequency of emission from transmitter 1' as F'. It will be seen that the beam 7' at the frequency F' is propagated upwardly in the path of approaching aircraft. I have indicated the aircraft at A, B, C; A', B', C'; A", B", C", approaching the location of the transmitting stations 1, 1' and 1" at different altitudes as indicated. The aircraft as represented may be either a single approaching aircraft or aircraft flying in military formation in preparation of a bombing attack.

The frequency emitted by transmitter 1" has been designated as F" separated in the frequency spectrum with respect to frequency F and F' sufficiently to enable groups of ultra-high frequency receiving stations to selectively receive energy reflected from aircraft at different altitudes.

For example, I provide a group of directive receiving stations designated at $Rf$, $Rf_1$, $Rf_2$, each disposed in geographically spaced positions and tuned to the frequency emitted by transmitter 1. Screens S, $S_1$ and $S_2$ substantially preclude direct response of the stations $Rf$, $Rf_1$ and $Rf_2$ to the energy emitted from station 1 and render the receiving stations more selective to energy reflected from the aircraft indicated at the elevations A, B and C.

The directive receiving stations may each be of the self orienting type employing principles set forth in Frederick J. Hooven Patent 2,173,841 of September 26, 1939, wherein the directional loop antenna is automatically moved to a position proportional to the direction from which the signal incident upon the loop is received. The automatic orientation means which is initiated in movement upon receipt of the reflected signalling energy at stations $Rf$, $Rf_1$ and $Rf_2$ operate to automatically control the orientation of destructive weapons indicated at G, $G_1$ and $G_2$ which are trained on the path of flight of aircraft in advance of the position from which reflected energy is received from the aircraft. Upon receipt of signalling energy the destructive weapons are initiated in operation, thereby shelling the path of flight of the aircraft successively and setting up a barrage of fire through which aircraft cannot penetrate. Each of the receiving stations may be connected through line systems 8, 8₁ and 8₂ with the central station 5 by which a portion of the output energy from each receiving station may be utilized to operate indicators at the central station. Such an arrangement enables the system to be used as a means of determining the approach of aircraft long in advance of the sight and sound range of the aircraft from an observing position.

Further groups of signal receiving stations are arranged in geographically spaced positions with respect to the first group of receiving stations and with respect to the transmitting stations. I have indicated a second group of receiving stations at $Rf'$, $Rf_1'$ and $Rf_2'$ arranged in positions to receive reflected energy from aircraft at altitudes $A'$, $B'$ and $C'$. The receiving stations are each protected by screens $S'$, $S_1'$ and $S_2'$ from direct reception of energy from transmitter $1'$ so that the energy received is limited to the reflection of energy from the aircraft at altitudes $A'$, $B'$ and $C'$ respectively. The receiving stations are of the self orienting type and control the orientation of destructive weapons $G'$, $G_1'$ and $G_2'$ which are trained upon the path of flight of the aircraft and which are initiated in repeating operation upon receipt of reflected energy from the aircraft.

In further spaced geographical locations I arrange receiving stations $Rf''$, $Rf_1''$ and $Rf_2''$ of the self-orienting loop type for receiving reflected energy from aircraft propagated from transmitter $1''$ when the aircraft intercepts such energy at altitudes $A''$, $B''$ and $C''$ as indicated. The receiving stations $Rf''$, $RF_1''$ and $Rf_2''$ are each screened from direct reception of transmitter $1''$ by means of screens $S''$, $S_1''$ and $S_2''$. The receivers each orient and control the operation of destructive weapons $G''$, $G_1''$ and $G_2''$. Similar extension of the facilities as outlined is carried out by the addition of further transmitters and groups of coacting receivers disposed in spaced geographical positions at such related locations that one or more of the receiving stations become activated by reflected energy by aircraft approaching at various altitudes. That is to say, the transmitters and groups of coacting receivers are so located that the angle of incidence and angle of reflection of the energy from the body of the aircraft in flight at a given altitude is confined within sufficient limits to enable an impulse to orient the loop receiver and trigger off the destructive weapon. While the altitude of the aircraft may be such that some of the receiving stations do not receive reflected energy, others of the receiving stations do receive such energy for a sufficient time period to initiate the receiving station in operation. In certain installations I may employ the receiving stations as listening devices so that instructions may be given to ground crews for orienting and firing the destructive weapons. It is not necessary in carrying out my invention that the receiving stations serve both to orient and trigger off the destructive weapons as the receiving stations may be employed either as listening outposts or triggering means, or both.

Fig. 2 shows in plan view the arrangement of transmitting and receiving stations explained in Fig. 1. It will be seen that the destructive weapons are arranged in groups controlled by the respective receiving stations so that a sheet or wall of fire is set up across the flight path of the aircraft as the aircraft approach the transmitting stations.

In the arrangement shown in Figs. 1 and 2, the transmitting and coacting groups of receiving stations are shown substantially separated over relatively wide geographical distances. I may locate a receiving station coacting with a transmitting station closely adjacent the transmitter as represented in Fig. 3 and shown more clearly in Figs. 6 and 7. In this arrangement an ultra-high frequency directive transmitter 11 is provided with a directive transmitting antenna 12 excited from transmitter 13 for upwardly propagating a beam of ultra-high frequency energy 17 according to the position of reflector 16. The receiving system includes the directive loop 14 connected to signal receiving circuit 15 which is partially balanced with respect to the transmitting antenna 12. A shield 18 is provided for eliminating in as large a degree as feasible the direct action of the transmitter upon the receiver allowing the receiver to respond to energy reflected from the aircraft indicated at 19 in the direction indicated at 20. The circuit arrangement for the associated transmitting and receiving circuits of Fig. 3 is illustrated more particularly in Fig. 6 in which an amplifier detector circuit is shown consisting of balanced electron tubes 21 and 22 having their control grids 21a and 22a connected to opposite ends of secondary winding 23 of transformer 24 as shown. The input circuit from loop 14 couples to the signal receiving circuit 15 through primary winding 25 of transformer 24. The input circuit to tubes 21 and 22 is completed by connection 26 on secondary winding 23 through source of potential 27 and winding 28 to the cathode circuit connected to cathodes 21b and 22b. The output circuit of the amplifier detector extends from anodes 21c and 22c to the high impedance network 29 and through tap 30 to source of potential 31 and winding 32 of output transformer 33 returning to the cathode circuit. The transmitter is excited by an ultra-high frequency oscillator shown generally at 35 coupled through winding 36 to the amplifier detector circuit and to the radiation circuit. The radiation circuit is tuned by means of condenser 37 and is connected through flexible leads 38 to coupling transformer 39 by which energy will be radiated from doublet antenna 12. The doublet antenna 12 is insulatingly supported as indicated at 40 with respect to the reflector 16. A phase adjuster 41 is interposed between the radiation circuit and the amplifier detector circuit in series with coupling coil 42 as shown. The energy supplied to the radiation circuit and emitted from doublet 12 is thus controlled out of phase with the energy supplied to the amplifier detector circuit by adjustment of the phase adjuster 41. The output system of the detector amplifier is coupled through secondary winding 43 of transformer 33 to the indicator 44, the telephone headset or sound reproducer 45 and the winding of the operating relay 46. Armature 47 of relay 46 is arranged to close contact 48 for closing the circuit from power source 49 to the fire control mechanism 50 of the destructive weapon or gun 51. The balanced amplifier detector circuit is operated by the phase difference between the radiated energy and the received energy. The received energy depends upon the passage of an aircraft in a flight path which intercepts the beam of energy propagated as indicated at 17. The intercepted energy is reflected by the aircraft 19 along path 20 to activate loop 14. The altitude of the aircraft above the earth changes the phase relation between the received current and the excitation current to the radiating circuit which may be observed by alternate increases and decreases in the indications on meter 44. The difference in phase between the receiving signalling energy and the transmitted signalling energy unbalances the operation of the amplifier detector circuit and enables an impulse to be heard in telephone headset 45 and causes the closing of the relay control circuit whereby gun or destructive weapon 51 is initiated in operation. Successive firing of the gun may be continued for a predetermined time period so that successive aircraft crossing the flight path will run into a sheet or wall of continued shelling.

In order to permit observing personnel to accurately control the direction of propagation of beam 17, the reflector 16 of the radiating system is pivotally mounted at 52 on base support 53. The extreme end of reflector 16 is provided with a handle bar system 54 which enables the free end of reflector 16 to be shifted upwardly or downwardly in an arc indicated by arrows 55 along a guide rail shown at 56. Thus the angle of propagation of beam 17 may be selectively fixed for the most effective operation under particular conditions of attack.

In order that advantage might be taken of periodic searching of the sky with a beam of energy, I provide the arrangement shown in Fig. 7 in which the extremity of reflector 16 is connected to a rockably mounted control head 57 which coacts with a retractable grip device 58 carried by handle member 59. A hand lever 60 is mounted on handle 59 for rendering temporarily ineffective the spring member 61 which normally tends to force the retractible grip device 58 into engagement with the reciprocatory drive rod 62. The reciprocatory drive rod 62 connects at one end to a band member 63 which surrounds the eccentric cam 64 driven by shaft 65 from gear 66 through worm 67 from motor 68. As motor 68 revolves worm 67 gear 66 is rotated and cam 64 revolves to impart reciprocatory motion to band 63 to drive rod 62 in a longitudinal path. So long as retractible grip 58 is engaged in notches 69 and 70 formed in reciprocatory rod 62 the reflector 16 moves periodically about pivot 52 as a center. This has the effect of sweeping the sky above the transmitting station with a beam of ultra-high frequency energy. When such energy is intercepted by an aircraft in flight, reflection of the energy occurs and receiving stations located in different geographical positions within the reflective distance of the aircraft are activated. However, when it is desired to set the radiated beam in a particular angular position, this is effected by operating lever 60 disengaging the retractable grip 58 so that reflector 16 no longer follows the reciprocatory movement of the drive rod 62. Motor 68 may be shut off and reflector 16 shifted to any selected position, maintaining retractable grip 58 out of engagement with drive rod 62 by operation of lever 60. Other forms of variable sweep movements may be employed and I intend no limitations upon my invention by the particular form disclosed.

The receiving and transmitting arrangements described in Figs. 6 and 7 may be multiplied in various geographical positions as illustrated in Fig. 3 where I have indicated similar coacting transmitting and receiving stations at 11', 11'' and 11''' controlling destructive weapons 51', 51'', 51''' as shown for disabling aircraft in the general positions indicated at 19', 19'' and 19'''. The several transmitting and receiving circuits may be monitored from a central station indicated at 71 over line circuits designated generally at 13a, 15a, 15a', 15a'', 15a'''. For purposes of explaining the arrangement in Fig. 3 I have shown similar parts with primed notations added to indicate corresponding parts in the different transmitter-receiver groups.

Fig. 4 schematically illustrates the form of self orienting receiver and destructive weapon control mechanism employed in the arrangement illustrated in Figs. 1 and 2. The self orienting receiver system has been illustrated at 72 connected to antenna 73 and orientable loop 74. The driving motor 75 which controls the angular movement of loop 74 in its hunt about a minimum drives worm 76 which is engaged with gear 77 on main shaft 78 which connects to the orientable loop 74. Shaft 78 is extended to the adjustable bevel gear system 79 which is capable of manual angular adjustment through gear 80 controlled by hand wheel 81. Thus the self-orientable loop may be manually adjusted in the event that the automatic orientation feature is not desired. The gear system 79 has shaft 82 extending therefrom, which shaft controls the position of the actuating windings of a "Selsyn" generator indicated at 83. The "Selsyn" generator 83 connects through a synchronous follow-up system 84 to the windings of a "Selsyn" motor indicated at 85. "Selsyn" motor 85 drives shaft system 86 terminating in gear 87 which through suitable gearing drives turn table 88 of the ordnance device or destructive weapon 51. The destructive weapon 51 is normally trained on the path of flight of the aircraft in a position sufficiently in advance of the aircraft to enable a direct hit to be made upon receipt of a reflected impulse from the aircraft through the signal receiving system. The destructive weapon is normally aimed to shell across the path of flight of the aircraft and a single impulse is sufficient to complete the proper orientation thereof. The receiver 72 has the output thereof connected to indicator 44, sound reproducer 45 and control relay 46 similar to the arrangement illustrated in Fig. 6. Control relay 46 when activated by receipt of an impulse serves to close the fire control circuit to the destructive weapon 51 through fire control mechanism 50, thereby initiating the destructive weapon in operation. The successive firing of the destructive weapon continues for a predetermined time period, setting up a wall or sheet of fire across the flight path of the aircraft.

In Fig. 5 I have shown a further modified form of the system of my invention in which the emitted frequency of the propagated beam of energy is cyclically changed over a predetermined portion of the frequency spectrum. An oscillator 90 has the oscillatory circuit thereof tuned by a condenser 91 which is successively and continuously rotated by motor 92 for changing the frequency impressed upon doublet 12. Accordingly the propagated energy at the path 17 varies over a predetermined frequency range and the variously tuned groups of coacting receivers may thus respond in different geographical positions to energy reflected by the aircraft and incident upon the loop 14 as illustrated in Fig. 5. It is understood that the circuits of the receiver connected with loop 14 are selectively tuned and set. Accordingly, one or more of geographically separated and isolated receivers may be activated in the event that an aircraft should intercept the beam of energy in the reflective distance and frequency range of that particular receiver for thereby setting into operation the destructive weapon 51.

The system of my invention may be used to protect metropolitan and industrial areas as represented more particularly in the arrangement shown in Fig. 8. The metropolitan or industrial area to be protected has been represented generally at 95. Attacking aircraft are prevented from approaching the metropolitan or industrial area 95 by a barrage of antiaircraft guns which are set up around the area to be protected in variously arranged groups and the operation thereof is controlled by the radio control system of my invention long in advance of the approach of attacking craft within sight or sound range of the area to be protected. The number of destructive weapons controlled by the different radio control circuits may be varied and the frequency relationships of the radio control circuits may be selected to utilize frequencies available in the frequency spectrums. The arrangement of the transmitting and receiving stations may be similar to either of the plans shown in Figs. 1 and 2 or the plan illustrated in Fig. 3. For the purpose of identifying parts corresponding to the parts illustrated in Fig. 1, for example, I have shown transmitting station 1 comprising doublet 2 acted upon by reflector 6 for propagating energy upwardly which when reflected is received by receiving station R/ for controlling the operation of destructive weapons G. Similar arrangements of protective means are multiplied around the metropolitan or industrial area for carrying out the protective system of my invention.

In Fig. 9 I have shown a coastline 96 which is equipped with a multiple system of protective transmitting stations indicated generally at 1, 1' and 1" for propagating beams of energy upwardly into the path of approaching aircraft indicated generally at 97, 98 and 99. As the aircraft approach within reflective distances of the propagated beams from the transmitting stations, receivers R/, R/' and R/" are activated initiating in operation guns G, G' and G" for shelling across the path of flight of aircraft. My invention contemplates the aiming of the destructive weapons in such positions that all conditions of drift and velocity of the approaching aircraft are amply compensated and the shelling directed in such a position that direct hits may be made against attacking aircraft.

In addition to the applications of my invention heretofore explained, I may apply the principles of my invention between moving bodies such as between one aircraft and another aircraft or one vehicle and another vehicle or one automobile and another automobile or between one landcraft generally and another landcraft for detecting the presence of such moving bodies. A protective system employing the principles of my invention may be utilized on tanks where destructive weapons on tanks automatically go into operation when the tanks come within reflective range of attacking tanks or stationary objects. My invention is also applicable to the aiming of small fire arms independently of the larger antiaircraft guns disclosed herein.

While I have described my invention in certain preferred embodiments I realize that various changes and modifications may be made and I intend that such changes and modifications shall be included within the scope of the appended claims.

What I claim as new and desire to secure by Letters Patent of the United States is as follows:

1. In a system for protecting geographical areas against attack of aircraft, a multiplicity of energy transmitting stations, means connected with said stations for propagating energy upwardly in a fan-like beam successively sweeping a predetermined area within the limits of an acute angle into the path of flight of aircraft, a multiplicity of energy receiving stations disposed in spaced positions with relation to certain of said transmitting stations for receiving reflected energy intercepted by the aircraft, and means controlled by the reflected energy received by said receiving stations for firing a preaimed destructive weapon at the aircraft in flight.

2. In a system for protecting geographical areas against attack of aircraft, a multiplicity of energy transmitting stations, means connected with said stations for propagating energy upwardly in a fan-like beam successively sweeping a predetermined area within the limits of an acute angle into the path of flight of aircraft, a multiplicity of energy receiving stations disposed in spaced positions with relation to certain of said transmitting stations for receiving reflected energy intercepted by the aircraft, a destructive weapon individual to each of said energy receiving stations trained upon the course of flight of the aircraft, and means controlled by the energy reflected by the aircraft in flight received by said receiving stations for initiating said destructive weapon in operation.

3. In a system for protecting geographical areas against attack of aircraft, a multiplicity of energy transmitting stations, means connected with said stations for propagating energy upwardly in a fan-like beam successively sweeping a predetermined area within the limits of an acute angle into the path of flight of aircraft, a multiplicity of energy receiving stations disposed in spaced positions with relation to certain of said transmitting stations for receiving reflected energy intercepted by the aircraft, a destructive weapon trained upon the course of flight of the aircraft, and means controlled by certain of said energy receiving stations for initiating said destructive weapon in operation upon flight of the aircraft in a path adapted to reflect energy from the energy transmitting stations.

4. A protective system comprising in combination a multiplicity of energy transmitting stations disposed in spaced positions along a course of flight for aircraft, means for propagating energy upwardly from said transmitting stations in a fan-like beam which successively sweeps the flight path of the aircraft within the limits of an acute angle, a multiplicity of receiving stations geographically spaced from said transmitting stations and arranged to discriminate against direct reception of energy from said transmitting stations while responding to energy reflected upon said receiving stations by aircraft flying across the path of the energy emitted by said transmitting stations, a destructive weapon trained upon the course of flight of the aircraft, and means responsive to the excitation of said receiving stations by the energy reflected by the aircraft in flight for initiating said destructive weapon into operation.

5. The method of protecting geographical areas upon the approach of aircraft which comprises directing a beam of energy upwardly into the path of flight of the aircraft, shifting the direction of the beam alternately through substantially the limits of an acute angle, locating an energy receiving station in a position for receiving energy reflected by the aircraft, and locating at least one preaimed projectile-firing weapon in the vicinity of said receiving station and controlling the firing of the weapon in response to the received reflected energy.

6. The method of protecting geographical areas against attack by aircraft which comprises directing a beam of energy upwardly into the path of flight of the aircraft, shifting the direction of the beam alternately through substantially the limits of an acute angle, locating an energy receiving station in a position for receiving energy reflected by the aircraft, and closing the fire control circuit of an anti-aircraft gun aimed on the flight path of the aircraft upon receipt of energy reflected from the aircraft.

7. In a system for protecting geographical areas against attack of aircraft, a multiplicity of energy transmitting stations arranged for propagating energy upwardly in beams directed at different angles from the earth into the path of flight of aircraft, a multiplicity of energy receiving stations disposed in spaced positions with relation to certain of said transmitting stations for receiving reflected energy intercepted by the aircraft at different altitudes according to the passage of the aircraft through the various angularly directed beams, destructive weapons aimed upon the path of flight of the aircraft, and means controlled by the reflected energy received by said receiving stations for initiating said destructive weapons into shelling operation.

8. In a system for protecting geographical areas against attack of aircraft, a multiplicity of energy transmitting stations arranged for propagating energy upwardly into the path of flight of aircraft, a multiplicity of automatically orientable energy receiving stations disposed in spaced positions with relation to certain of said transmitting stations and comprising responsive means automatically orientable to a position directed toward the point of reflection of the energy reflected by aircraft intercepting the energy propagated by said energy transmitting stations, a positional control system operated by said responsive means, a destructive weapon trained upon the path of flight of the aircraft, means operated by said positional control system for orienting the destructive weapon to a direction for shelling the path of flight of the aircraft, and means actuated by the energy reflected by the aircraft for initiating the destructive weapon into shelling operation.

9. In a system for protecting geographical areas against hostile aircraft from a ground station, an anti-aircraft gun having a firing control mechanism, means for propagating a beam of energy upwardly in a substantially narrow beam from the ground station into the path of flight of the aircraft, means for periodically changing the angular position of the beam substantially within the limits of an acute angle for sweeping a relatively wide portion of the flight of the aircraft, means for receiving the reflected energy, and means connected between the firing control mechanism of said anti-aircraft gun and said last mentioned means responsive to the received reflected energy from the aircraft in positions where the aircraft and said beam intercept, for firing projectiles across the flight path of the aircraft.

10. In a system for detecting the approach of aircraft from a ground station, means for automatically generating energy and propagating such energy upwardly in a beam to altitudes intercepting the path of flight of the aircraft, means for periodically changing the angular relation of the beam with respect to the earth's surface substantially within the limits of an acute angle for sweeping a relatively wide portion of the path of flight of the aircraft, means for interrupting the operation of said first mentioned means and adjusting the beam to a selected position, a multiplicity of energy receiving stations disposed in spaced positions with respect to said means for propagating said beam of energy for receiving the reflection of said energy from the aircraft in flight, a destructive weapon trained on the path of flight of the aircraft, and means initiated by the receipt of energy reflected from the aircraft for initiating said destructive weapon in operation.

11. A system for protecting geographical areas against attack by aircraft comprising an electrical generator, means connected with said generator for propagating a beam of electrical energy upwardly into the path of flight of aircraft, manual control means for changing the angle at which the electrical energy is propagated into the path of flight of the aircraft, a multiplicity of energy receiving stations disposed at spaced positions with respect to the position at which the electrical energy is propagated upwardly for separately receiving energy reflected at different altitudes by aircraft in flight intercepting the propagating beam of energy, destructive weapons aimed into the path of flight of the aircraft and in advance of the indicated position of the aircraft, and means controlled by the receipt of energy reflected by the aircraft for initiating said destructive weapons in operation.

12. In a system for protecting geographical areas against attack by aircraft, an energy generating station, a multiplicity of spaced energy receiving stations, destructive weapons controlled by each of said energy receiving stations, means for propagating energy upwardly from said energy generating means into the path of flight of approaching aircraft, said aircraft operating to reflect the beam of energy upon certain of said energy receiving stations, and means for changing the angle at which the energy is propagated upwardly from said generator substantially within the limits of an acute angle for intercepting the aircraft in flight in various positions along the course of flight and reflecting the energy upon selected receiving stations for activating the destructive weapons controlled thereby.

13. A system for protecting geographical areas comprising a multiplicity of geographically spaced beam transmitting stations, each operative to propagate upwardly into the path of flight of the aircraft a beam of ultra-high frequency electrical energy at different frequencies over a band of frequencies, means for successively sweeping the path of flight of the aircraft with said beams of high frequency energy, a multiplicity of groups of ultra-high frequency directive receiving stations located in spaced geographical positions with respect to said beam transmitting stations, certain of said groups of ultra-high frequency directive receiving stations being tuned to the frequency of propagation of each of said ultra-high frequency beam transmitting stations for receiving energy propagated by said beam transmitting stations and reflected by the aircraft in flight at various altitudes, destructive weapons aimed at the path of flight of the aircraft and circuit connections extending between certain of said ultra-high frequency directive receiving stations and the control mechanism of said destructive weapons for initiating said weapons in operation upon receipt of energy reflected from the aircraft.

14. In a system for detecting the approach of aircraft, an ultra-high frequency energy transmitting station, means associated therewith for propagating ultra-high frequency energy upwardly into the path of aircraft in flight, means for periodically and successively sweeping a predetermined area of the path of flight of the aircraft with said ultra-high frequency energy through substantially the limits of an acute angle, a signal receiving station electrically tuned to said transmitting station whereby said receiving station is responsive to energy reflected by aircraft in flight independently of direct radiation from said transmitting station, a destructive weapon, and means operated by said receiving station for orienting said destructive weapon and initiating said weapon in operation upon receipt of reflected energy from the aircraft.

15. In a system for detecting the approach of aircraft, in combination, means for propagating ultra-high frequency energy in a vertical direction comprising a support, a doublet antenna insulatingly mounted on said support, a reflector coextensive with said support, means for exciting said doublet antenna for propagating energy upwardly according to the angular disposition of said reflector, means for shifting the angular disposition of said support periodically for periodically changing the angle of propagation of ultra-high frequency energy from said doublet antenna through substantially the limits of a right angle, and means for interrupting the operation of the aforesaid means and manually controlling the angular position of said support for selectively fixing the angle of propagation of the ultra-high frequency energy, and a directional receiving system responsive to energy reflected from an aircraft in flight, including means for indicating instantaneously the coordinated position of the aircraft reflecting the energy propagated at said fixed angle.

16. A fortress for protecting geographical areas comprising in combination with a multiplicity of destructive weapons aimed upwardly into the path of flight of aircraft, a radio transmitter located in an outpost position, means for directing radio frequency energy upwardly from said radio transmitter into the path of flight of aircraft approaching the fortress, means for sweeping the path of aircraft by said radio frequency energy through substantially the limits of an acute angle, a directive radio receiving station electrically balanced with respect to the direct reception of energy from said transmitter and responsive to reflected energy from said radio transmitter intercepted by approaching aircraft in flight, and means controlled by said radio receiver for initiating said destructive weapons in operation.

17. A system for protecting geographical areas against attack by aircraft comprising fortresses consisting of destructive weapons aimed into the path of approaching aircraft and grouped on the different boundaries of the geographical area to be protected, a radio transmitter and receiver individual to selected groups of destructive weapons, said radio transmitter and receiver for each group of destructive weapons operating on different frequency assignments within a band of frequencies, the radio transmitter associated with each group of destructive weapons being located in an outpost position with respect to the area to be protected and operating to continuously propagate upwardly a beam of radio frequency energy sweeping the path of approaching aircraft through substantially the limits of an acute angle, the associated radio receiver being spacially related in a position to receive energy reflected by the aircraft intercepting the propagated energy, and means connected with said radio receiver and responsive to energy reflected by the approaching aircraft for initiating said groups of destructive weapons in operation.

18. The method of protecting geographical areas from invasion by aircraft which consists in directing upwardly from spaced positions in the area to be protected beams of ultra-high frequency electrical energy variously disposed at different angles with respect to the earth, locating receiving stations in spaced positions throughout the area to be protected, receiving reflected energy from aircraft intercepting the beams of energy at various altitudes, preaiming a destructive weapon toward the path of flight of the invading aircraft in a position to compensate for the flight speed of the aircraft and initiating the destructive weapon in operation upon receipt of such reflected energy.

19. In a system for locating objects by radiant energy, means for directionally transmitting radiant energy in a fan-like beam, drive means for periodically sweeping said beam across the area in the general vicinity of the object to be located, and means for interrupting the operation of said drive means for manually shifting said beam to selected positions in the area swept by said beam in the periodic sweep thereof.

20. In a system for locating aircraft by radiant energy, means for propagating radiant energy in a substantially fan-like beam across the path of flight of aircraft, drive means for periodically sweeping the beam across the path of flight of the aircraft, means for arresting the operation of said drive means, and manual means for controlling the angular position of propagation of the beam while said drive means is in arrested condition.

21. In a system for locating aircraft by reflective effects of radiant energy propagated toward the aircraft, a radiant energy emitter, a reflecting surface insulatingly supporting said radiant energy emitter, a pivotal connection about which said reflecting surface is adapted to be moved for changing the angle of propagation of radiant energy with respect to the earth, drive means for periodically moving said reflecting surface about said pivotal connection, means for interrupting the operation of said drive means for manually shifting the position of said reflecting surface whereby the propagated radiant energy may periodically sweep a predetermined area during the operation of said drive means and be selectively adjusted to a particular angular position during operation of the manual means.

22. In a system for locating aircraft by reflective effects of radiant energy propagated toward the aircraft, a radiant energy emitter, a reflecting surface insulatingly supporting said radiant energy emitter, a pivotal connection about which said reflecting surface is adapted to be moved for changing the angle of propagation of radiant energy with respect to the earth, drive means for periodically moving said reflecting surface about said pivotal connection, a manually operable clutch for disconnecting said drive means with respect to said reflecting surface and subjecting said reflecting surface to manual adjustment in an angular position whereby a beam of radiant energy may be made to periodically sweep an overhead area under one condition and may be selectively set in a particular angular position with respect to the surface of the earth under manual control.

23. In a system of destruction, the method of destroying a body consisting of directively propagating radio frequency energy from a radio transmitter in the direction of the body, intercepting the propagated energy by the body, reflecting the energy intercepted by the body, receiving the reflected energy, developing a destructive force and directing and releasing the destructive force against the body that reflected the energy for destroying the same.

JAMES A. BRADLEY.